UNITED STATES PATENT OFFICE.

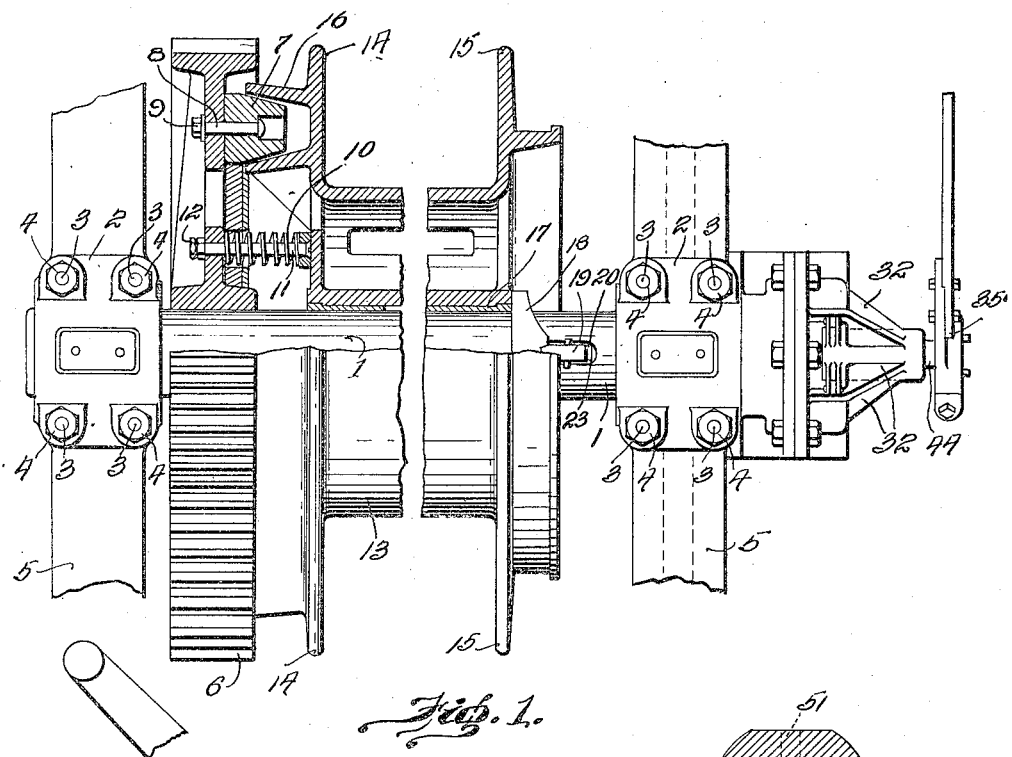

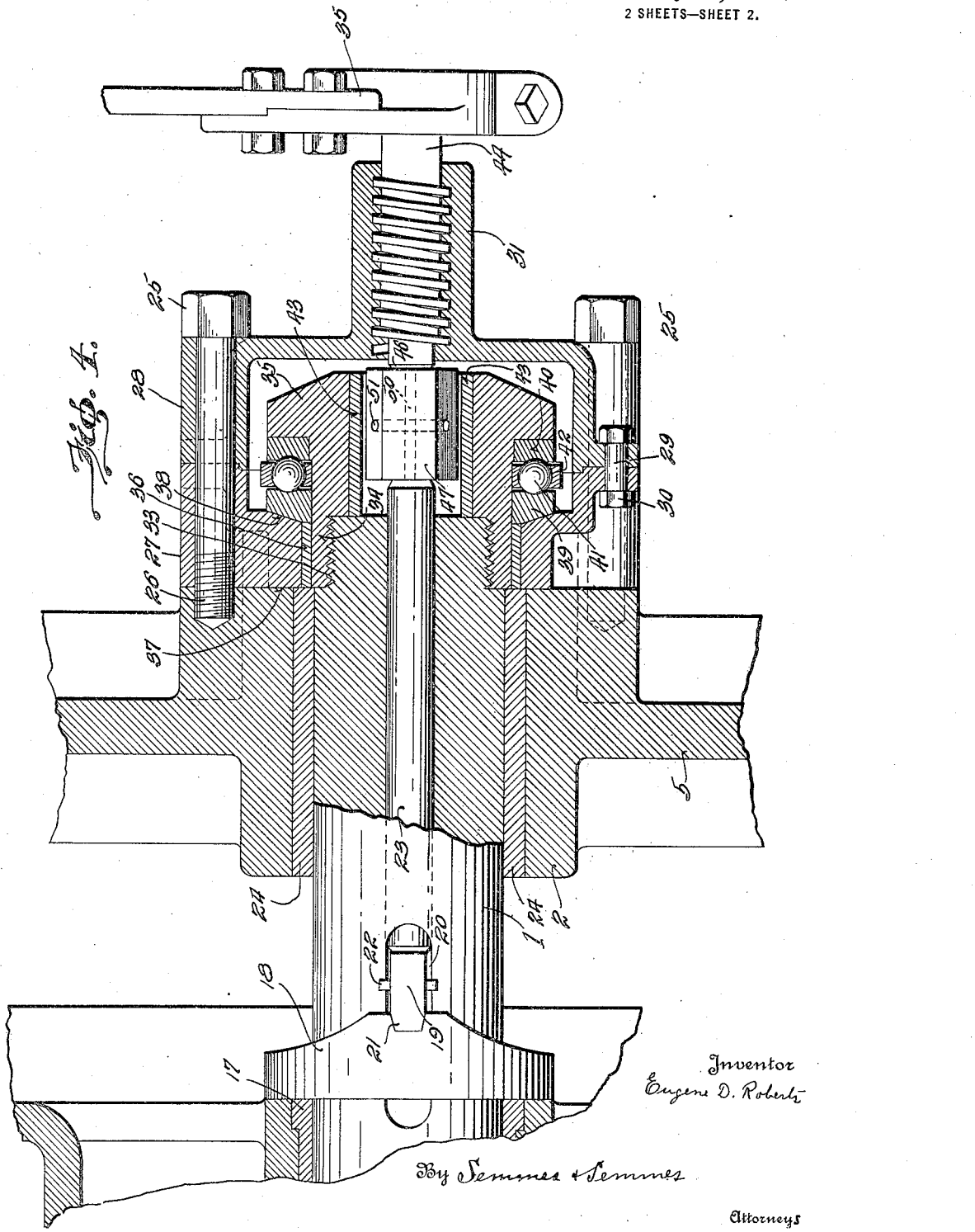

EUGENE D. ROBERTS, OF TACOMA, WASHINGTON.

CLUTCH-OPERATING MECHANISM.

1,423,023.           Specification of Letters Patent.     Patented July 18, 1922.

Application filed April 13, 1921. Serial No. 461,115.

*To all whom it may concern:*

Be it known that I, EUGENE D. ROBERTS, citizen of the United States, residing at Tacoma, in the county of Pierce and State of Washington, have invented certain new and useful Improvements in Clutch-Operating Mechanism, of which the following is a specification.

This invention relates to certain new and useful improvements in clutch operating mechanism and it has particular relation to that class of such devices which are used in connection with the rope drum of hoisting or logging engines.

As heretofore constructed in a device of the kind to which this invention belongs where means are used for the purpose of operating hoisting drums, one or more pins have been mounted within an apertured shaft, which pins by means of a thrust screw and lever impart to the clutch the necessary thrust to force the drum toward the driving gear and bring the members of the clutch into engagement one with the other. In operation such a construction has not been found entirely satisfactory, first, because by reason of the friction between the several pins, they not infrequently become so heated as to impede the operation of the mechanism, if not to jam and entirely prevent it, and secondly, because of the excessive wear upon the thrust collar where it contacts with the bearing; this being brought about mainly by carelessness of the operator to furnish sufficient lubrication.

The objects of my invention are to overcome these difficulties and this I accomplish by securing an extended thrust collar firmly to one end of the shaft and introducing a ball bearing of standard type between the shoulder on the thrust collar and the shoulder on the interior of the casing or housing in which the thrust collar and its cooperating parts are enclosed. In addition to this, I chamber the extended thrust collar so as to permit of the placing therein, intermediate the thrust screw and the thrust pin, of a thrust block freely revolving and sliding between them. I have found in practice, that this construction overcomes largely the frictional heating of the thrust pin and thrust screw in operation. In order to further minimize the frictional heating, I so construct the casing or housing that there will be ample room for the thrust collar and the cooperating mechanism to continually revolve in a bath of oil.

Another object of my invention is to so arrange the parts of the device as to effect a more general distribution of the strains and of the axial stresses existing during the engagement of the clutch members, so that the reaction thrust will be borne by the shaft bearings.

With these and other objects in view which may be incident to my improvements, the invention consists in the parts and combinations to be hereinafter set forth and claimed, with the understanding that the several necessary elements comprising my invention, may be varied in construction, proportions and arrangement, without departing from the spirit and scope of the appended claims.

In order to make my invention more clearly understood, I have shown in the accompanying drawings means for carrying the same into practical effect, without limiting the improvements in their useful applications to the particular constructions, which for the purpose of explanation, have been made the subject of illustration.

In the drawings:

Figure 1 is a plan view of a hoisting machine embodying my invention, showing part of the drum and friction clutch in section.

Fig. 2 is an end view of the thrust screw end of the shaft showing the operating lever.

Fig. 3 is a detail view in cross section of the thrust block, and

Figure 4 is an enlarged detail view mostly in section showing the mechanism employed for pushing the clutch members into engagement.

The numeral 1 represents a drive shaft journalled in bearings 2 the members of which are securely bolted together by bolts 3 having nuts 4, said bearings being supported upon standards or blocks 5 suitably attached to a base, not shown. Near the left bearing, and firmly mounted upon the shaft 1 so as to rotate therewith is a gear wheel 6 provided on one side with friction cone blocks 7 secured thereto by bolts 8 and nuts 9. Upon this wheel and nearer its axis are equidistantly located spiral springs 10 held thereto by means of bolts 11 and nuts 12. Loosely mounted upon the shaft 1 and concentrically therewith is a drum 13 whose outer vertical edges are expanded so as to form disk-like members 14 and 15, the former of which is provided at a point opposite the friction cone blocks 7 with a flaring angular ring 16, the purpose of which is to engage with the cone blocks upon the other member of the clutch when pushed in its direction with sufficient force to overcome the strength of the pressure springs 10, which normally tend to keep the drum out of engagement with the friction blocks. It will be observed that while the drum is mounted upon the shaft there is fitted therein and in direct contact with the shaft a steel or other suitable bushing 17 so as to permit of its better lubrication and smoother rotation when in operation.

There is fitted to the shaft 1 a push ring 18, the same being engaged by a cross bar 19 located within a transverse slot 20 extending longitudinally of the shaft 1 and fitting into a kerf or slot 21 in said ring, a small bolt 22 extending through the cross bar on each side to prevent it from dropping through the transverse slot as the shaft revolves. The shaft 1 from a point slightly to the left of the collar to its termination within the casing or housing presently to be described is axially drilled so as to provide a longitudinal opening for the insertion therein of the thrust pin 23. The numeral 24 refers to the bushing mounted in the bearing 2 in which the shaft 1 revolves and attached to this bearing by means of stud bolts 25 extending into screw threaded apertures 26 in the bearing is a housing or casing composed of two sections, namely, an inner part 27 which is bolted to the drum shaft bearing 2 and an outer part 28 bolted to the inner part by bolts and nuts 29 and 30. The manner of the attachment of this casing or housing to the shaft bearing is more clearly shown in Fig. 4 and it will be noticed that the outer section has a screw threaded extension 31 integral therewith. Reenforcing arms 32 extend from the outer section of the casing to the end of the extension, as is clearly seen in Figs. 1 and 2.

Referring again to Fig. 4 the end of the shaft 1 beyond the bearing is cut down somewhat in diameter and has a screw thread 33, the purpose of which is to provide for the reception of the extended thrust collar which is interiorly and correspondingly screw threaded and fits thereon. Said collar consists of a shank 34 and an enlarged head 35 and interposed between the shank and the inner section of the casing 27 is a bushing 36. The inner section of the casing fits flatly against the bearing at the point 37 but at the point 38 it is provided with a shoulder. Between this shoulder and the head of the extended thrust collar are two annular blocks 39 and 40 forming race-ways for the anti-friction balls 41, which latter are held in position in the race-ways by the enclosing ring 42. It will be noted that the block 39 is on the side next to the shoulder and is of a shape to conform thereto.

The interior of the extended thrust collar is chambered and provided with a bushing 43 of hardened steel as the wear upon this part of the mechanism is heavy and a bushing of the character described will better withstand the wear. If, however, it should accidentally become excessive and injure the bushing, the latter may readily be removed and a new one substituted therefor.

It will be observed that there is considerably more space within the casing than is necessary for the mechanism therein, and this is purposely provided for the reception of a quantity of oil, as it is my intention that the extended thrust collar and its cooperating parts should revolve in an oil bath, thus reducing the friction to a very considerable degree.

As seen in Fig. 4 the extension 31 is interiorly screw threaded for the reception of an exteriorly threaded thrust screw 44, the outer end of which is attached to the operating lever 35' and the inner edge of which is made flat with its edge slightly bevelled as seen at 46. The extended thrust collar is chambered and between the inner end of the thrust screw and the opposite end of the thrust pin 23, and within the chamber, I interpose a freely revolving and sliding thrust block 47.

Attention is invited to the configuration of this block which has three rounded sides 48 and three flattened sides 49 with a longitudinal aperture 50 and three lateral apertures 51, the flattened sides permitting a plentiful amount of oil to readily flow into the apertures, and lubricate fully the ends of the thrust pins. In this manner I overcome the trouble which has heretofore been encountered at this point from the overheating of the friction pins.

I have found that by reason of the design of my extended thrust collar, I am able to substitute this ball bearing type of collar in all standard types of mechanism of this character for the ordinary type heretofore used and that I am able to make this substitution without the necessity of providing a specially designed shaft.

The operation of my device is as follows: The shaft 1 revolves continuously so long as power is applied but the drum 13 turns freely thereon, the friction member upon the gear wheel and the friction member upon the drum disk being kept out of engagement and completely disassociated one from the other by reason of the pressure springs 10, the shaft 1 turning in its bearings 2 and the extended thrust collar on the other end of the shaft 1 revolving freely in the oil bath within the casing. When, however, it is desired that the drum should turn with the shaft then by means of the shift lever 35 longitudinal movement is imparted to the thrust screw 44, the end of which contacts with one end of the thrust block 47, the other end which contacts with the thrust pin 23 presses against the cross bar 19. This cross bar 19 pushes the push ring 18 upon the drum and drives the friction member on the other end thereof into contact with the friction member upon the gear wheel and the drum revolves. By turning the lever in the opposite direction the pressure of the springs 10 is restored and the members of the clutch again become disassociated and the drum again freely revolves upon the shaft 1.

Respecting the friction, it will be noted that in order to reduce this as far as possible, I interpose between the collar 18 and the thrust screw 44, three members, each of which is entirely disconnected with the other save by purely frictional contact; that where the greatest thrust and pressure comes, is within the casing; and, that all of the parts revolving therein are positioned in a bath of oil; that the friction which comes upon the thrust head is largely reduced by the ball-bearings and that the reaction of the axial thrust or stress is through the outer section of the casing to the inner section of the casing directly to the shaft bearing 2 through the stud bolts 25 which unites the casing to the shaft bearing.

Attention is invited to the fact that the casing is entirely closed with the exception of a small opening near the edge thereof with a door or cover 52, as is seen in Fig. 2. This opening is provided for the purpose of pouring oil therein so that the interior mechanism, at all times, may operate in a bath of oil.

While I have shown and described the preferred embodiment of my invention, I wish it to be understood that I do not confine myself to the precise details of construction herein set forth, by way of illustration, as it is apparent that many modifications and variations may be made therein, by those skilled in the art, without departing from the spirit of the invention, or exceeding the scope of the appended claims.

I claim as my invention:—

1. In a device of the character described, the combination with a shaft, bearings therefor, a clutch having one member rotatably fixed on the shaft and the other member secured to a drum and rotatable upon the shaft, a thrust-pin within the shaft, a shouldered and chambered thrust collar attached to one end of the shaft, a removable bushing within the thrust-collar, a casing enclosing the thrust collar and provided with a shoulder against which the shoulder on the thrust collar abuts, an extension on the casing, and a thrust screw therein, of a thrust block with three flattened sides adapted to revolve within the thrust chamber and located between the thrust screw and the thrust pin and means between the thrust screw and the drum operable by axial movement in one direction to lock the shaft and drum together.

2. In a device of the character described the combination with a shaft, bearings therefor, a clutch having one member rotatably fixed on the shaft and the other member secured to a drum and rotatable upon the shaft, a thrust-pin within the shaft, a shouldered and chambered ball-bearing thrust collar attached to one end of the shaft, a casing enclosing the thrust collar provided with a shoulder against which the shoulder on the thrust collar abuts, an interiorly screwthreaded extension on the casing, and a thrust screw therein, of a thrust block with three flat sides fitting within the chamber and located between the thrust screw and the thrust pin and means between the thrust screw and the drum operable by axial movement in one direction to lock the shaft and drum together.

3. In a device of the character described the combination with a shaft, bearings therefor, a clutch having one member rotatably fixed on the shaft and the other member secured to a drum and rotatable upon the shaft, and a thrust-pin within said shaft of a chambered shouldered thrust collar secured upon one end of the shaft, a casing enclosing the same provided with a shoulder against which the shoulder on the thrust collar abuts, an interiorly screw threaded extension on the casing, and a thrust screw therein, of a revolving and sliding thrust block having oil channels therein fitting within the chambered thrust-collar and located between the thrust screw and the thrust pin and means between the thrust screw and the drum operable by axial movement in one direction to lock the shaft and drum together.

4. In a device of the character described the combination with a shaft, bearings therefor, a clutch having one member rotatably fixed on the shaft and the other member secured to a drum and rotatable upon the shaft, a thrust-pin within said shaft, a shouldered and chambered ball-bearing thrust collar attached to one end of the shaft, a casing enclosing the thrust collar and provided with a shoulder against which the shoulder on the thrust collar abuts, an interiorly screw threaded extension on the casing, and a thrust screw therein, of a revolving and sliding thrust block having oil channels therein and flattened sides to permit the oil to flow into and through said channels to lubricate the ends of the thrust screw and pin fitting within the chamber and located between the thrust screw and the thrust pin and means between the thrust screw and the drum operable by axial movement in one direction to lock the shaft and drum together.

In testimony whereof I affix my signature.

EUGENE D. ROBERTS.